United States Patent [19]

Fletcher et al.

[11] 4,066,039
[45] Jan. 3, 1978

[54] ADJUSTABLE SECURING BASE

[76] Inventors: James C. Fletcher, Administrator of the National Aeronautics and Space Administration, with respect to an invention of; Paul P. Zebus, Lakewood; Poley N. Packer, Long Beach, both of Calif.

[21] Appl. No.: 721,150

[22] Filed: Sept. 7, 1976

[51] Int. Cl.² .............................................. B05C 13/00
[52] U.S. Cl. ...................... 118/500; 118/50; 51/235; 248/363; 269/21; 279/3
[58] Field of Search ................. 118/500, 501, 503, 50; 269/21, 22; 279/3; 248/362, 363; 101/382 MV, 126; 51/235; 72/465, 446

[56] References Cited

U.S. PATENT DOCUMENTS

| 1,443,316 | 1/1923 | Evans | 101/126 |
| 2,462,899 | 3/1949 | Riecken | 118/500 X |
| 2,729,040 | 1/1956 | Wallace et al. | 51/235 |
| 2,781,554 | 2/1957 | Robinson | 118/500 X |
| 2,904,916 | 9/1959 | Stahmann | 101/126 X |
| 3,172,358 | 3/1965 | Weiss | 101/126 |
| 3,380,434 | 4/1968 | Faber | 118/500 |
| 3,787,039 | 1/1974 | Zeichman | 248/363 X |

FOREIGN PATENT DOCUMENTS 1,401,918  8/1975  United Kingdom ................. 248/362

*Primary Examiner*—James Kee Chi
*Attorney, Agent, or Firm*—Marvin J. Marnock; John R. Manning; Marvin F. Matthews

[57] ABSTRACT

An adjustable securing base has a surface radius of curvature which can be adjusted to support an adjacent part on the base surface. The securing base comprises a flexible thin plate with an adjustment mechanism connected on opposite edges of the base for adjusting the plate curvature. An opening in the plate is coupled to a vacuum device for securing the part adjacent the plate surface.

5 Claims, 7 Drawing Figures

ADJUSTABLE SECURING BASE

ORIGIN OF THE INVENTION

The invention described herein was made in the performance of work under a NASA contract and is subject to the provisions of Section 305 of the National Aeronautics and Space Act of 1958, public law 85-568 (72 STAT 435; 45 USC 2457).

BACKGROUND OF THE INVENTION

1. Field of the Invention

The field of art to which the invention pertains includes the field of adjustable securing bases, particularly with respect to a support member whose curvature can be adjusted to support a part adjacent thereto.

2. Description of the Prior Art

In the construction of thermal protection systems for spacecraft, notably the space shuttle, it is necessary to install thin tile members, which are relatively brittle and have varying surface radius contours on the outer mold line of the spacecraft. Installation of the brittle ceramic coated tiles requires that a bonding/adhesive coating be placed on the tile inner surface for the attachment of a SIP (Strain Isolator Pad) prior to installation on the spacecraft. It has been found that when a wet coating is rolled on the inner surface of the tile, the ceramic tile may break when not evenly supported on its entire area. Conventional hold down techniques such as taping to a surface have been found to be unsuccessful due to surface to tile non-conformance. While vacuum hold down bases are known the bases cannot be adjusted to varying surface radius curvatures.

Known prior art includes U.S. Pat. Nos. 3,293,739 and 3,460,822.

The present invention provides a surface radius of curvature on a securing base which can be adjusted to conform to and uniformly support a part thereon. Breakage of fragile parts is minimized because of this uniform support and utilization of hold down to secure the part on the base.

SUMMARY OF THE INVENTION

An adjustable securing base has a surface curvature which can be adjusted to conform to and support an adjacent part. A flexible thin plate forms the securing base. Mechanical means are attached on the opposite edges of the base for adjusting the plate curvature. An opening is provided in the plate for attachment of a vacuum hose, whereby an adjacent part can be secured to the plate surface.

The advantages of this invention, both as to its construction and mode of operation, will be readily appreciated as the same becomes better understood by reference to the following detailed description when considered in connection with the accompanying drawings in which like reference numerals designate like parts throughout the Figures.

DESCRIPTION OF THE PREFERRED EMBODIMENTS

Figure 1:
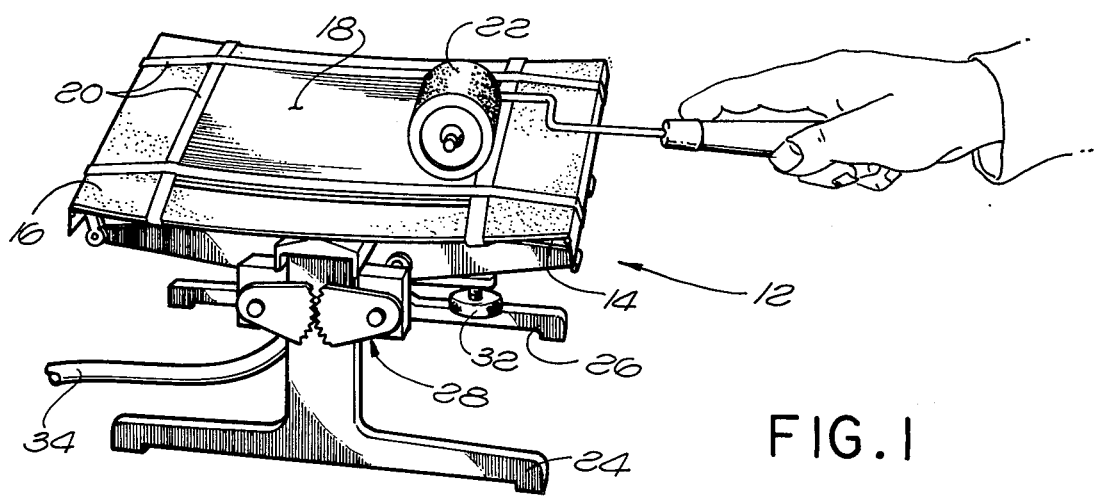
FIG. 1 is a perspective view of the adjustable securing base being utilized in accordance with the principles of the invention.

Referring now to the drawings, there is shown in FIG. 1 a perspective view of an adjustable securing base 12 constructed and being utilized in accordance with the principles of the invention. As illustrated in the drawing, the adjustable base 12 includes a flexible thin plate 14. Juxtaposed on the top surface of the flexible thin plate 14 is a support surface 16 which is affixed to the thin plate 14 top surface. A part 18 is shown mounted on a support surface 16 and is to be coated by a roller 22. Tape strips 20 illustrate the maskant technique applied to member 18 to prevent coating of restricted surfaces.

The flexible thin plate 14 is supported by a pair of inverted "T" bases 24 and 26 which form the support for the securing base 12. In addition, an adjustment mechanism 28 enables the flexible thin plate 14 to vary its radius of curvature when a knob 32 is rotated. The support surface 16, made of silicone foam material or cork, moves with the flexible thin plate 14, enabling the part 18 to be mounted on a similarly contoured surface. A vacuum is used to secure the part 18 to the support surface 16. A hose connection 34 is illustrated to show the vacuum connection to the securing base 12.

An inverted "U" shaped trough 36 extends the entire width of the flexible thin plate 14 and forms a fulcrum about which the plate 14 can bend. The trough 36 which is shown in cross-sectional view in FIG. 3 has its top surface 38 formed at the base of the "U" which is then welded or otherwise secured to the bottom surface of the thin plate 14. The interior downwardly facing bore 42 of the "U" shaped trough 36 forms a channel into which the upstanding arms 44 of the inverted "T" bases 24 and 26 can be positioned and secured therein.

An "L" shaped bracket 46 has a vertical arm 48 which is fixed to one side wall of the trough 36 interior. A horizontal arm 52 of the "L" shaped bracket 46 extends toward one end of the flexible thin plate 14 and has a threaded opening 54. A threaded shaft 56 fixed to the knob 32 engages the threaded opening 54. The free end 58 of the threaded shaft 56 has a vertical rod 62 extending upwardly therefrom. As previously mentioned with respect to FIG. 1, rotation of the knob 32 adjusts the flexible thin plate 14 curvature.

The interconnection between the knob 32 and the flexible thin plate 14 is accomplished by means of the adjustment mechanism 28. A hinge connection 66 and 68 interconnects the adjustment mechanism 28 at opposite ends, respectively, of the bottom surface 72 of the flexible thin plate 14. The hinge connections 66 and 68 are identical and are each formed of a first plate 74 which extends along the respective opposite ends of the bottom surface 72 of the flexible thin plate 14. The first plate 74 is welded or otherwise secured at the edge 76 of the thin plate 14. A hinge pin interconnects the first plate 74 and a freely movable plate 82 extending from the hinge pin 78 in a generally downward direction.

Figure 2:
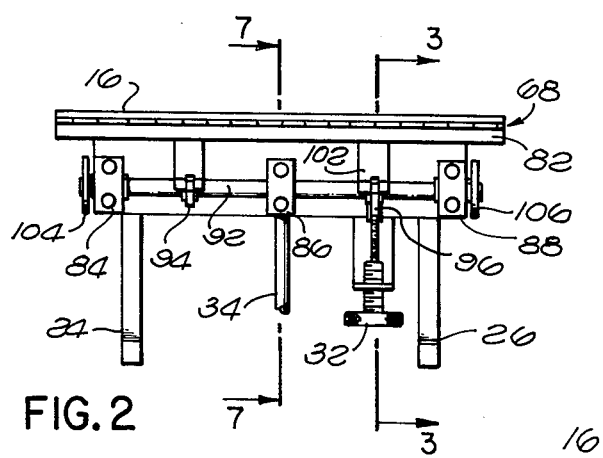
FIG. 2 is an end view of the adjustable securing base of FIG. 1.
Figure 3:
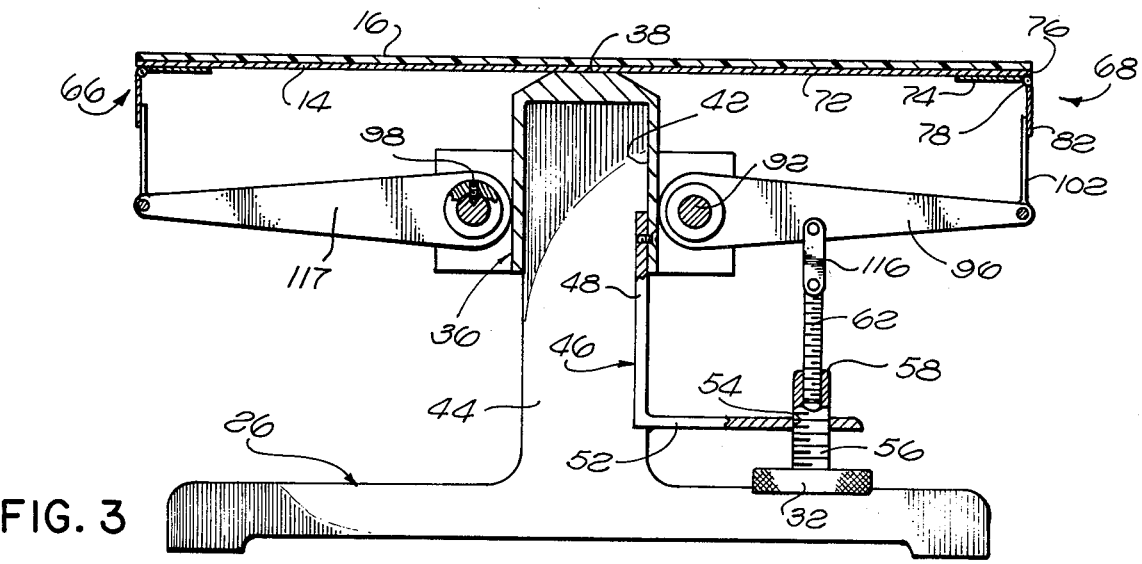
FIG. 3 is a cross-sectional view of the adjustable securing base of FIG. 2 taken along the line 3—3 thereof.

FIG. 2 illustrates the interconnection between the adjustment mechanism 28 and the flexible thin plate 14. The interconnection at the hinge connection 68 and the hinge connection 66 are substantially identical, with the knob 32 being mounted on the hinge connection 68 side of the securing base 12. A plurality of support blocks 84, 86 and 88 are fixed to the exterior side wall of the U-shaped trough 36. The support blocks 84, 86 and 88 support a shaft 92. A pair of arms 94 and 96 are affixed intermediate two of the support blocks, respectively, by means of a screw 98 (FIG. 3). As can be seen in FIG. 3, the free end of the arms 94 and 96 terminate approximately at the plane of the thin plate edge 76. A linkage 102 interconnects the free end of the arms 94 and 96 to the freely movable plate 82. The shaft 92 ends extend beyond the support blocks 84 and 88 and have meshing gears 104 and 106, respectively, mounted thereon and rotatable therewith.

The meshing gear 104 can be seen in FIG. 1 and its teeth 108 mesh with a similar gear 112 mounted on a shaft 114 on the hinge connection 66 side of the securing base. Similarly, the gear 106 meshes with an identical gear mounted at the other end of the shaft 114 (not shown).

Figure 4:
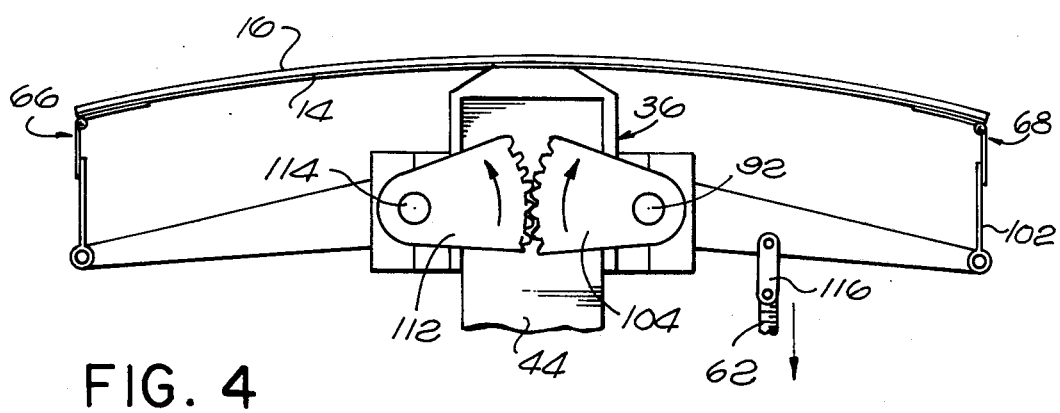
FIG. 4 is a partial side view of the securing base of FIG. 2 illustrating one mode of adjustment.
Figure 5:
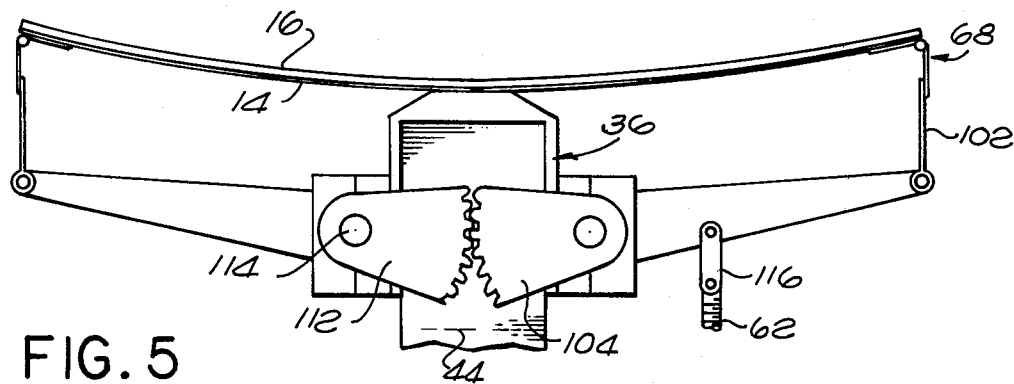
FIG. 5 is a side view of the adjustable securing base illustrating an alternative mode of adjustment.

The vertical rod 62, which is connected at one end to the threaded shaft 56, is connected at its other end through a linkage 116 to the arm 96, intermediate the arm 96 connection with the shaft 92 and the linkage 102. Rotation of the knob 32 causes the arm 96 to pivot and rotate the shaft 92. The shaft 92 movement in turn causes the arm 94 to similarly pivot. Additionally, as can be seen in FIG. 4, the movement of the shaft 92 in turn causes the gear 104 to move and mesh with the gear 112. The gear 112 is connected through the shaft 114 to arms 117 (one of which is shown in FIG. 4). The arms 117 are similarly coupled to the hinge connection 66 at the other end of the plate 14. Thus, as can be seen in FIG. 4, rotation of the shaft in a direction which causes the linkage 116 to move in a downward direction causes the flexible thin plate 14 to move at its ends in a downward direction and thus form a convex top surface. Similarly rotation of the knob in the opposite direction, as can be seen in FIG. 5, enables the thin plate 14 to form a relatively concave top surface.

Figure 6:
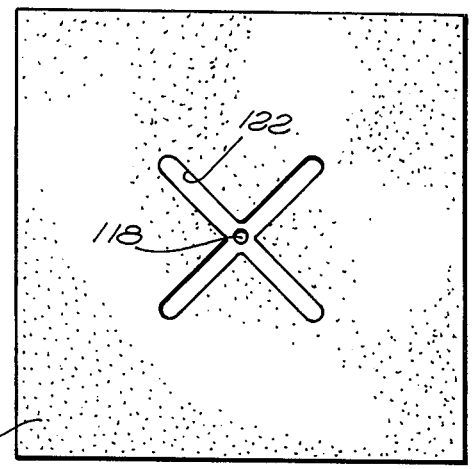
FIG. 6 is a top plan view of the adjustable securing base of FIG. 2.
Figure 7:
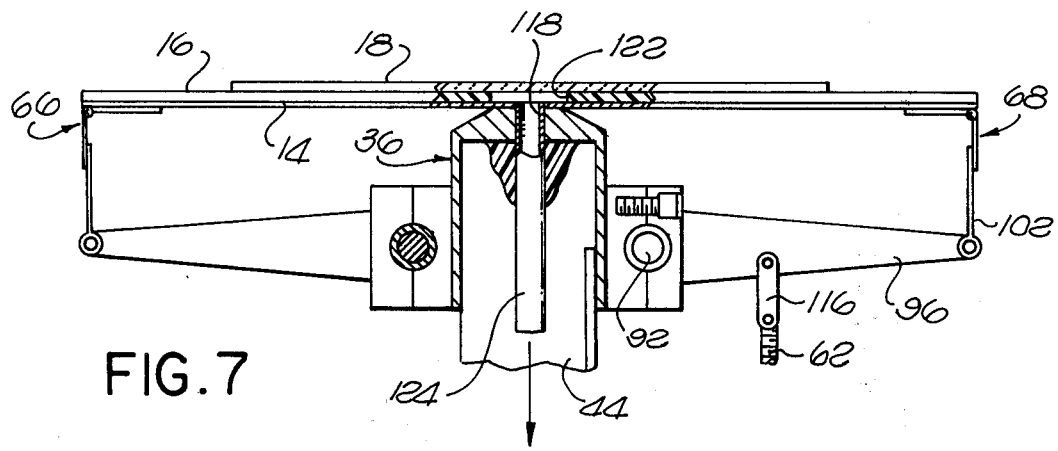
FIG. 7 is a cross-sectional view of the adjustable securing base of FIG. 2 taken along the line 7—7 thereof.

Referring now to FIG. 6, there is shown a central opening 118 in the flexible thin plate 14. In addition, a cross-channel 122 is formed in the support surface 16. The opening 118, as can be seen in FIG. 7, defines one end of a downwardly extending cylinder 124, the other end of which is connected to the vacuum hose 34 (FIG. 1). Thus, as can be seen in FIG. 7, when the flexible thin plate 14 is adjusted to the curvature of a part 18, a vacuum coupling to the cylinder 124 will aid in securing the member 18 to the support surface 16. The vacuum forces extend from the opening 118 along the cross-channel 122.

Thus, as can be readily seen, the present invention enables the flexible thin plate 14 to be adjusted to various curvatures of a plate member 18 whereupon coating can be applied and the member 18 held to the adjustable securing base 12 without damage to the member 18.

We claim:

1. An adjustable securing base having a surface contour of curvature which can be adjusted to support an adjacent part on said surface of curvature comprising:
    a flexible thin plate forming said securing base, said plate being of elongate configuration and having a pair of ends;
    a fulcrum secured to the underside of said plate and extending along the central width of said plate in support thereof;
    an opening formed in said plate;
    vacuum means connectable in communication with said opening for applying vacuum pressure to one surface of said adjacent part when disposed on said plate for securing said part to said plate; and
    adjusting means connected to opposite ends of said plate which are remote from said fulcrum for simultaneously applying similarly directed leverage forces substantially perpendicular to said plate and at the ends thereof which are remote from said fulcrum for flexing said plate and thereby adjusting its surface of curvature in a selected convex or concave configuration.

2. An adjustable securing base in accordance with claim 1 wherein said adjusting means is operative to uniformly adjust the radius of curvature of said flexible plate.

3. An adjustable securing base in accordance with claim 1 wherein said adjusting means include a pair of rotatable shafts;
    a pair of linkage elements, each operatively associated with a different one of said rotatable shafts and each hingedly connected to a different end of said plate at the plate's ends remote from said fulcrum;
    cooperating gear means on said shafts and said linkage elements responsive to rotation of said shafts to effect simultaneous movement of said plate ends with respect to aid fulcrum and in alike direction; and
    means for simultaneous rotating said shafts and operating said linkages to move the ends of said flexible plate in unison in either an upward or downward direction by a selected amount to thereby uniformly adjust said surface contour of curvature to conform to the mating surface of said adjacent part.

4. An adjustable base in accordance with claim 1 wherein a flexible support element is secured to a surface of said flexible thin plate and substantially coextensive therewith, said support element having channel openings formed therein and communicating with said plate opening to thereby increase the areal extent of the application of vacuum pressure to said adjacent part when secured on said base surface of curvature.

5. An adjustable base in accordance with claim 3 wherein said flexible support element is of softer material than said flexible plate and the channel openings in the flexible support element overlap said plate opening and extend generally radially therefrom.

* * * * *